United States Patent
Chan et al.

(10) Patent No.: US 10,069,686 B2
(45) Date of Patent: Sep. 4, 2018

(54) METHODS AND SYSTEMS FOR MANAGING A DEVICE THROUGH A MANUAL INFORMATION INPUT MODULE

(71) Applicant: Pismo Labs Technology Limited, Hong Kong (HK)

(72) Inventors: Alex Wing Hong Chan, Hong Kong (HK); Kit Wai Chau, Hong Kong (HK); Nusrat Rahman, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 0 days.

(21) Appl. No.: 15/351,442

(22) Filed: Nov. 15, 2016

(65) Prior Publication Data
US 2017/0195179 A1 Jul. 6, 2017

Related U.S. Application Data

(63) Continuation of application No. 14/003,235, filed on Sep. 5, 2013, now Pat. No. 9,497,069.

(51) Int. Cl.
*H04L 12/24* (2006.01)
*H04L 12/10* (2006.01)

(52) U.S. Cl.
CPC .......... *H04L 41/0869* (2013.01); *H04L 12/10* (2013.01)

(58) Field of Classification Search
CPC .................. H04L 41/0869; H04L 12/10
See application file for complete search history.

(56) References Cited

U.S. PATENT DOCUMENTS

| 8,806,246 | B1* | 8/2014 | Wu | G06F 9/4893 455/205 |
| 9,069,539 | B2* | 6/2015 | Schlichter | G06F 1/3203 |
| 2007/0162556 | A1* | 7/2007 | Ho | H04L 41/00 709/208 |
| 2010/0187915 | A1* | 7/2010 | Diab | H04L 12/10 307/115 |
| 2014/0115354 | A1* | 4/2014 | Jabbaz | H04L 12/10 713/310 |
| 2014/0245031 | A1* | 8/2014 | Hamdi | G06F 1/266 713/300 |
| 2015/0382293 | A1* | 12/2015 | Heidler | H04B 10/11 398/115 |

OTHER PUBLICATIONS

Wikipedia, "Power over Ethernet", May 3, 2013, 12 pages.*

(Continued)

*Primary Examiner* — Brian J. Gillis
*Assistant Examiner* — Chhian Ling
(74) *Attorney, Agent, or Firm* — Hershkovitz & Associates, PLLC; Abe Hershkovitz

(57) ABSTRACT

The present invention discloses methods and systems for managing a power over Ethernet (PoE) capable device through a manual information input module. Information is obtained through the manual information input module, and a current power mode is determined. Based on the information, a power mode is reset or applied. If it is determined to apply a power mode, internal switches are opened or closed and the device supplies or receives power over Ethernet according to the power mode.

18 Claims, 8 Drawing Sheets

(56) References Cited

OTHER PUBLICATIONS

IEEE802.3at standard, "Intro to PoE: Fundamentals, standards and implementations—Part II", Youhao Xi, National Semiconductor Corp., (Mar. 31, 2006).
IEEE802.3af standard, "Intro to PoE: Fundamentals, standards and implementations—Part II", Youhao Xi, National Semiconductor Corp., (Mar. 31, 2006).
Field-effect transistor (FET), "What is a FET: Field Effect Transistor Types", Electronics Notes, (May 15, 2008).
Bipolar transistor, Electronics Tutorials, (Jan. 28, 2011).
Insulated-gate bipolar transistor (IGBPT), Electronics Tutorials, (Aug. 11, 2012).
Metaloxide-semiconductor field-effect transistor (MOSFET), Electronics Tutorials, (Feb. 9, 2011).
Metal-semiconductor field-effect transistor (MESFET), Ian Poole, "GaAs FET MESFET Tutorial", (Sep. 3, 2008).
Junction 2011) field-effect transistor (JFET), Electronics Tutorials, (Feb. 9, 2011).

* cited by examiner

[Fig. 1]
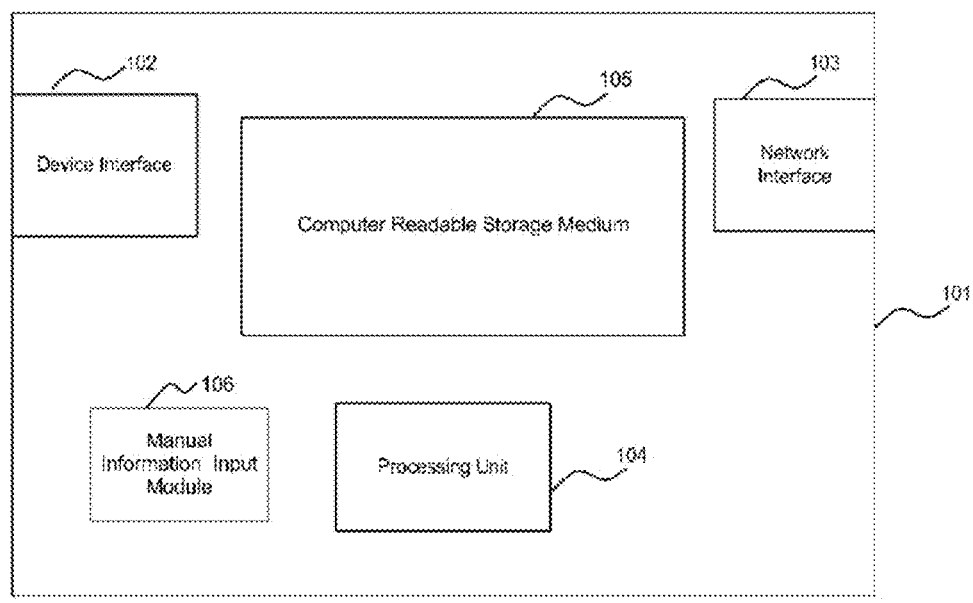

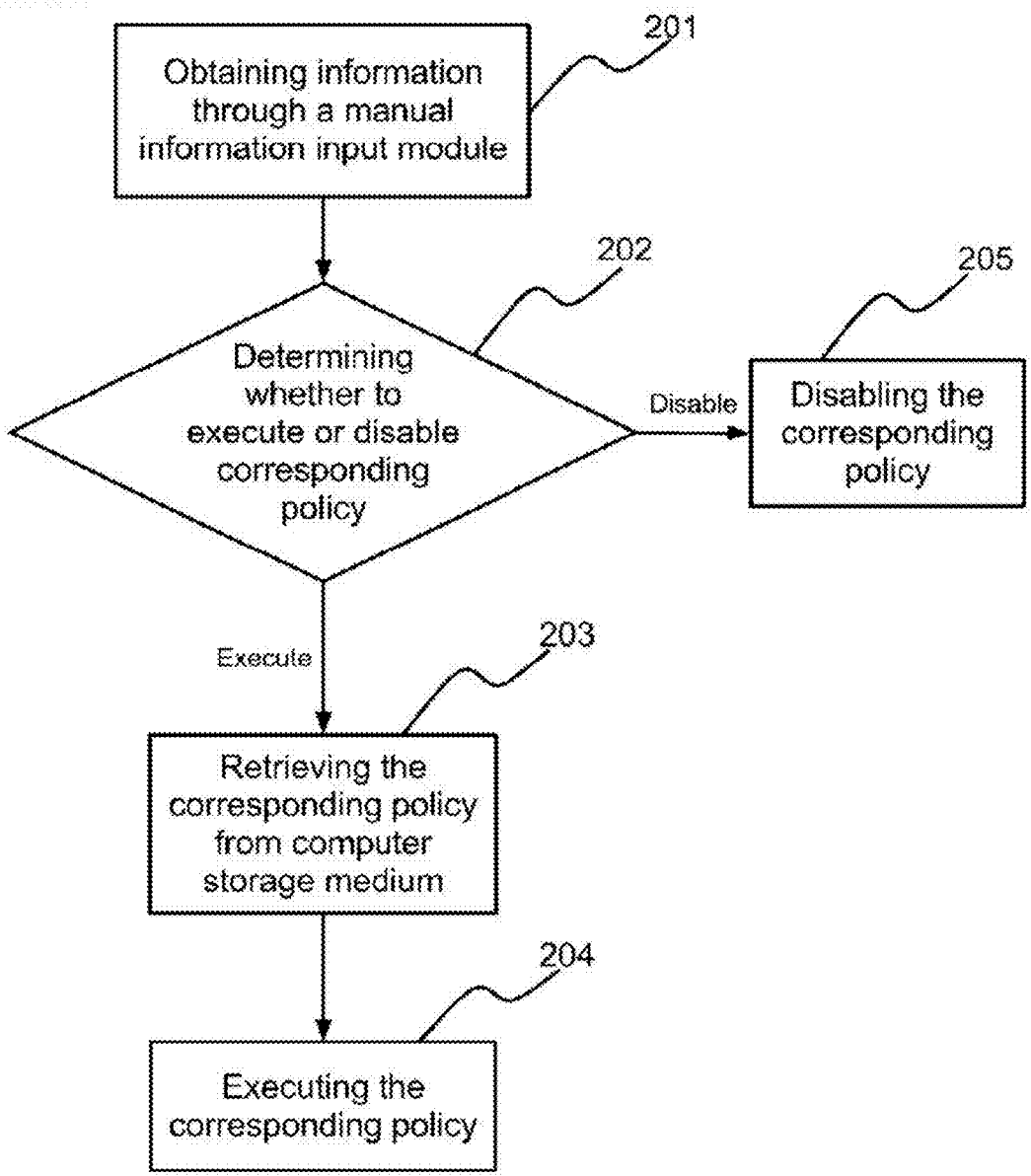

[Fig. 3]
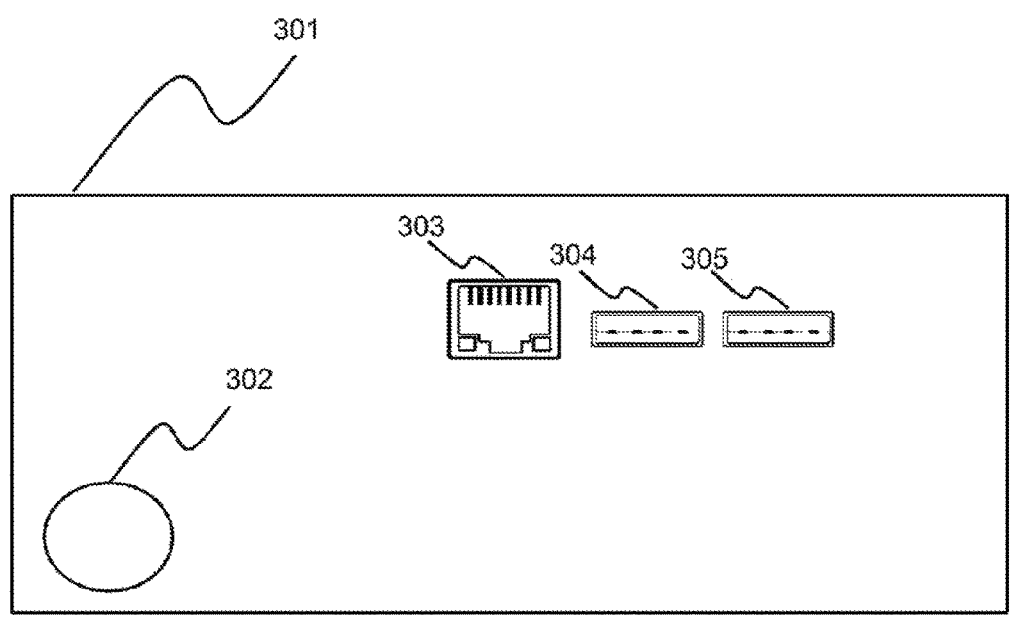

[Fig. 4]
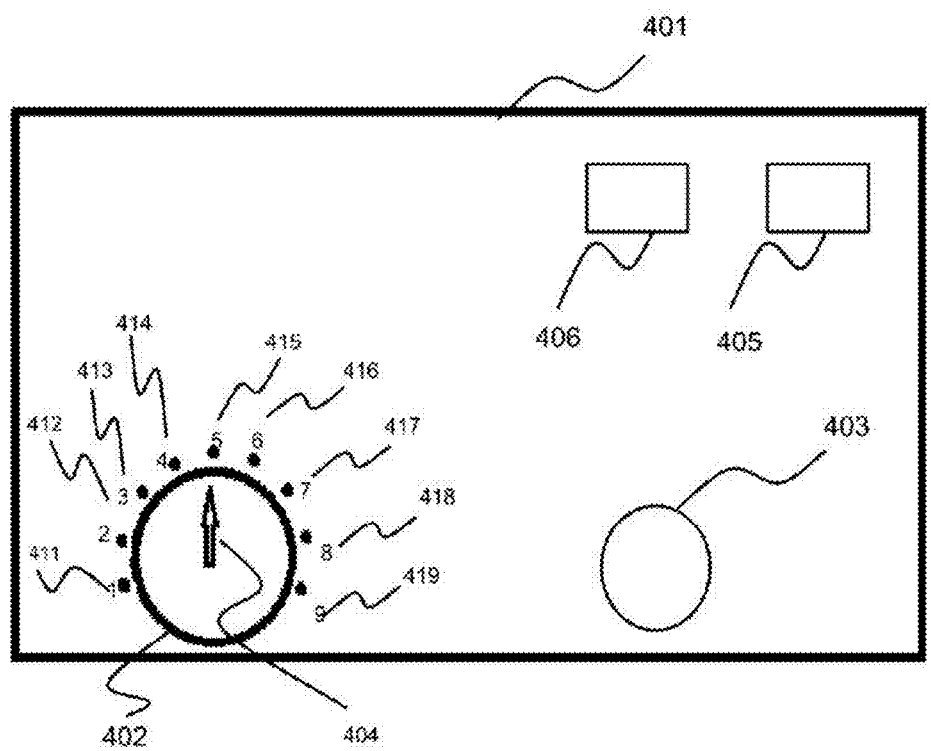
[Fig. 5]
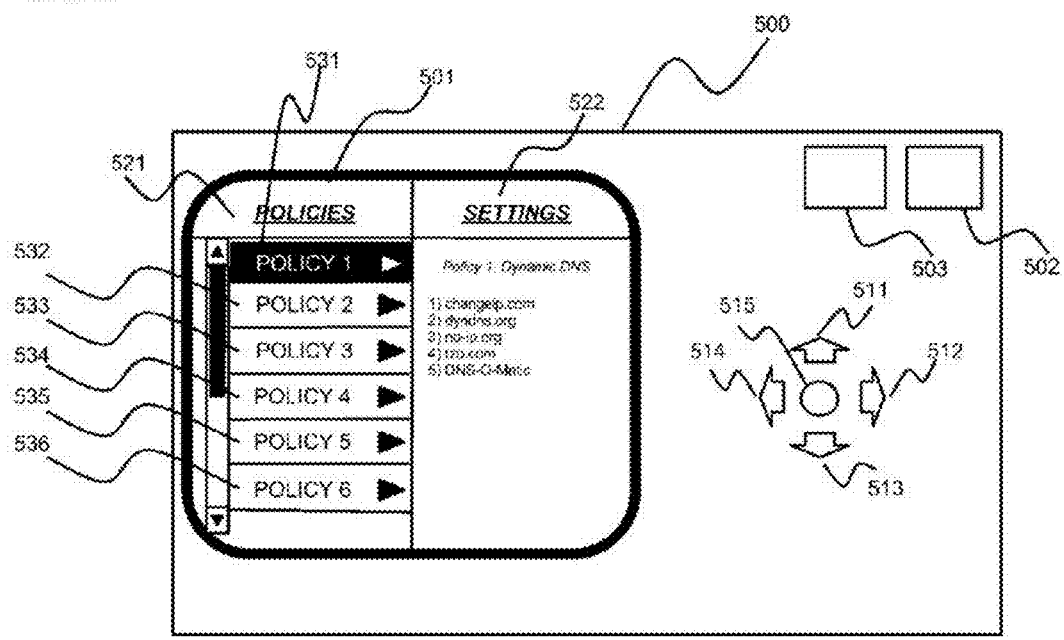

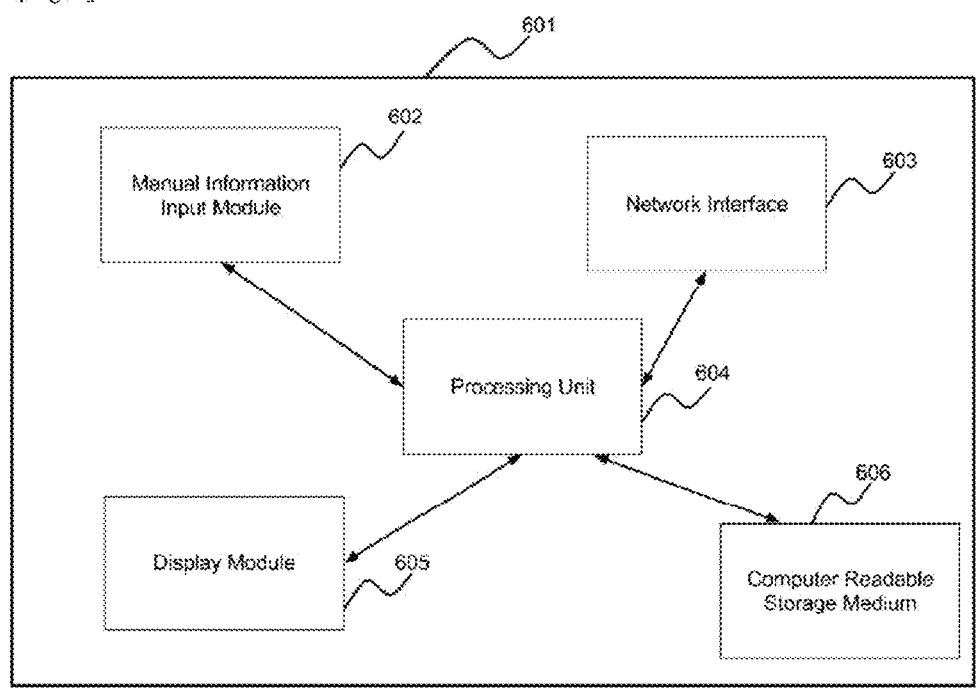

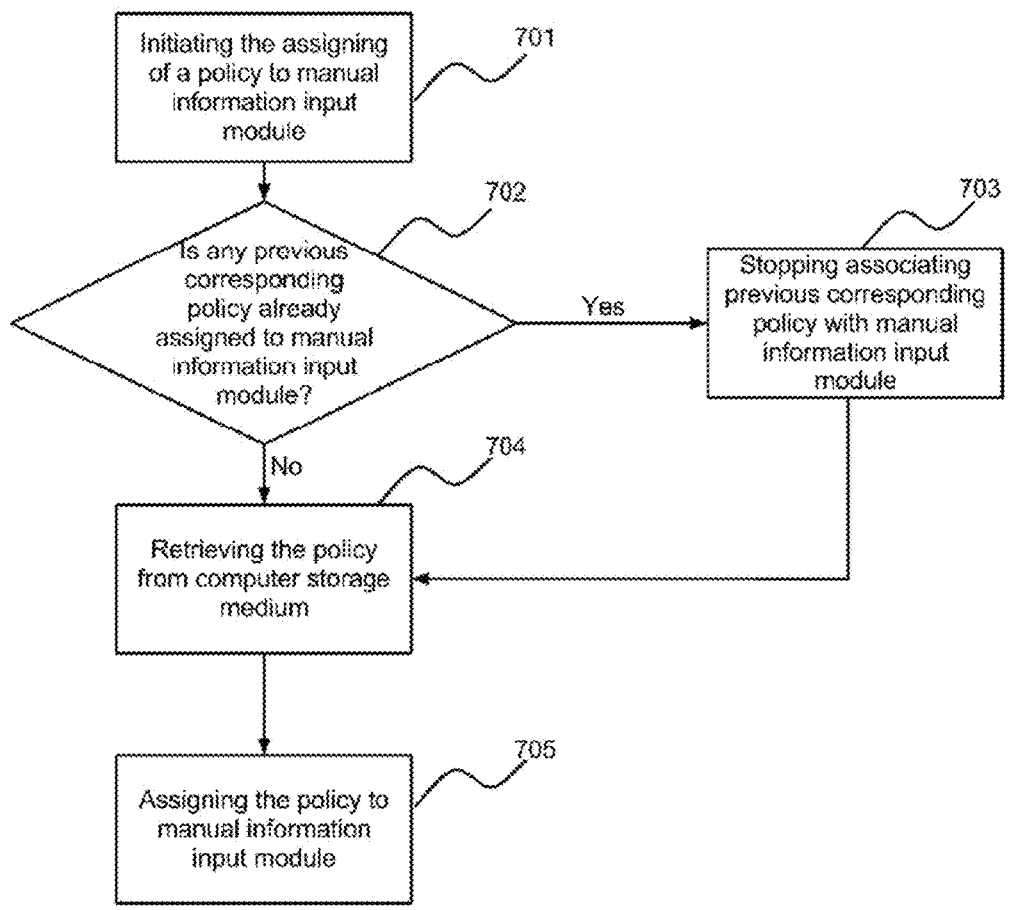

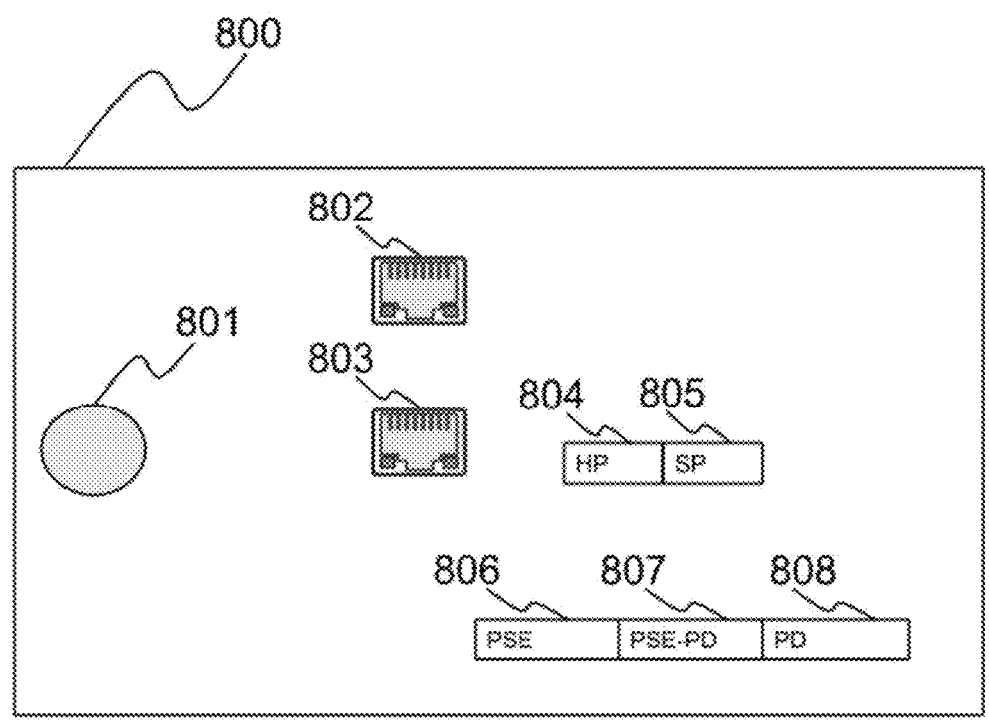
[Fig. 8]

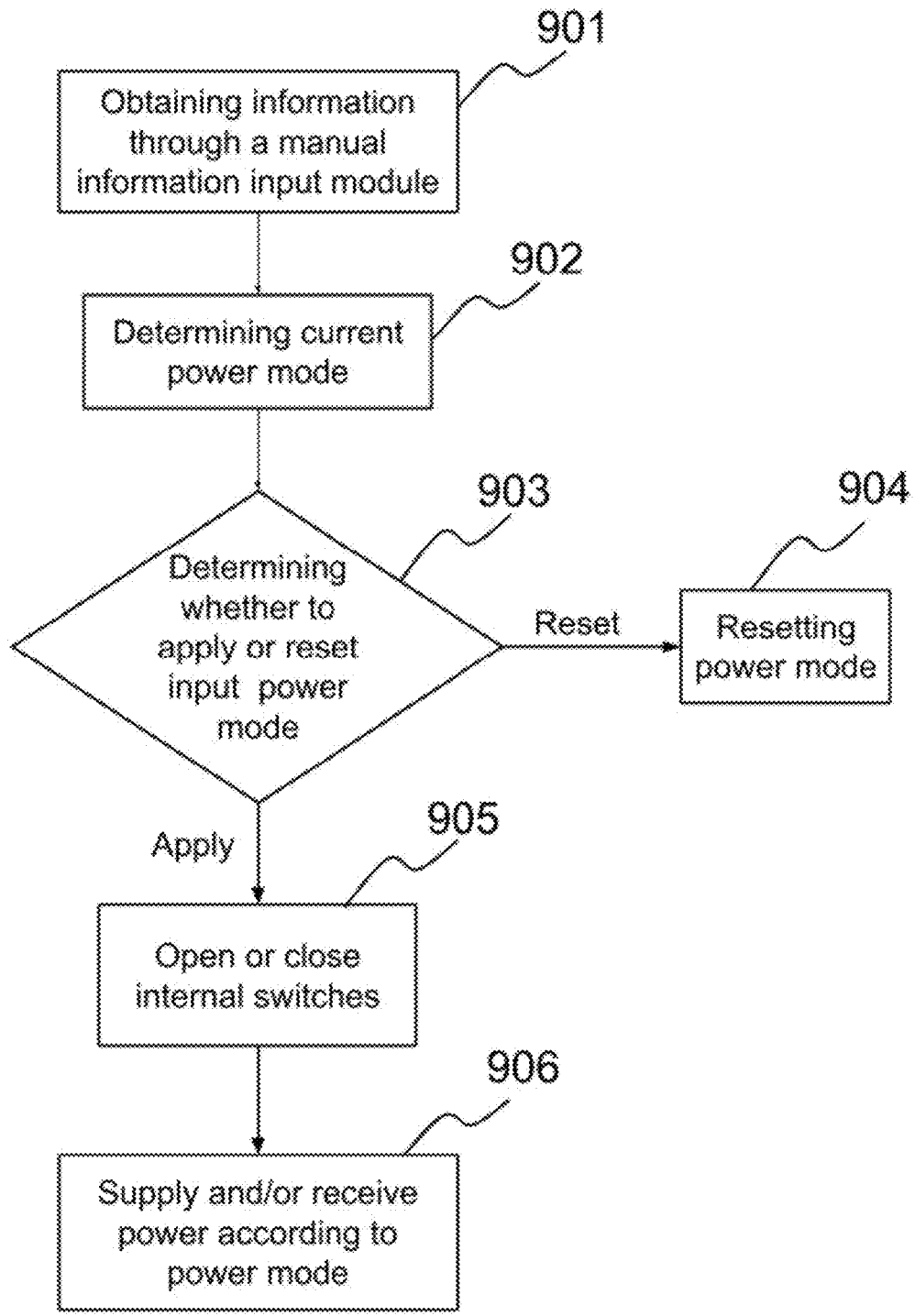
[Fig. 9]

METHODS AND SYSTEMS FOR MANAGING A DEVICE THROUGH A MANUAL INFORMATION INPUT MODULE

RELATED APPLICATIONS

The present application is a non-provisional continuation-in-part application which claims the benefits of and is based on application Ser. No. 14/003,235 titled "MANAGING POLICIES OF A DEVICE THROUGH A MANUAL INFORMATION INPUT MODULE" filed on 5 Sep. 2013. The contents of the above-referenced application are herein incorporated by reference.

FIELD OF INVENTION

This disclosure relates in general to the field of computer networks. More particularly, the present invention relates to a method and a device which provides a manual information input module to a user for executing at least one policy of the device, wherein the manual information input module may comprise of, but not limited to, one switch on the device. The at least one policy is configured by a user, administrator or the manufacturer of the device.

BACKGROUND ART

To execute policy(s) in a or manage a device usually a user is required to go through a process of specifying the policy(s) and its settings or choosing from several policy(s) before the policy can be executed. This procedure does not allow a convenient access to certain preferred policy(s), settings, or modes of the device that the user that wants to execute very frequently, and in a very short time. Many PoE capable devices may operate at different power levels. There may be safety hazards or devices may malfunction if the power level supplied or received is not compatible. Hence, solutions are required for a user to easily regulate the power supplied or received at a PoE capable device through an easy physical user interface.

SUMMARY OF INVENTION

The present invention discloses method and systems for managing a device through a manual information input module, wherein the device is a power over Ethernet (PoE) capable device. The processing unit of the device obtains information through a manual information input module. A current power mode is determined and based on that, it is determined whether to apply or reset a power mode. A power mode is reset if it is determined to reset a power mode. If it is determined to apply a power mode, internal switches are opened or closed and power is supplied or received over Ethernet according to power mode. The device is capable of supplying power and receiving power higher than a first power limit, wherein the first power limit is set according to IEEE802.3at standard or IEEE802.3af standard. The manual information input module comprises a high power (HP) switch, a standard power (SP) switch, a power sourcing equipment (PSE) switch, a powered device (PD) switch, and a PSE-PD switch. In one embodiment, resetting power mode is performed if an input power mode is same as the current power mode. The input power mode is determined based on the information obtained, wherein when the HP switch and PSE switch is pressed, input power mode is HP PSE mode; wherein when SP switch and PSE switch is pressed, input power mode is SP PSE mode; wherein when the HP switch and PD switch is pressed, input power mode is HP PD mode; wherein when SP switch and PD switch is pressed, input power mode is SP PD mode; wherein when the HP switch and PSE-PD switch is pressed, input power mode is HP PSE-PD mode; wherein when SP switch and PSE-PD switch is pressed, input power mode is SP PSE-PD mode. In one embodiment, the input power mode is confirmed after a first switch is pressed. The internal switches are selected from a group consisting of a field-effect transistor (FET), a bipolar transistor, an insulated-gate bipolar transistor (IGBT), a metaloxide-semiconductor FET (MOSFET), a metal-semiconductor FET (MESFET), a junction FET (JFET) and a relay. The device comprises at least two Ethernet interfaces. In one embodiment, the current power mode is indicated by light emitting diode (LED) lights mounted on the manual information input module.

BRIEF DESCRIPTION OF DRAWINGS

FIG. 1 is an illustrative block diagram of the device of the present invention;

FIG. 2 is a flowchart illustrating the generalized method of the present invention according to one of the embodiments;

FIG. 3 is an illustration of a device implementing one of the embodiments of the present invention;

FIG. 4 is an illustration of a device implementing one of the embodiments of the present invention;

FIG. 5 is an illustration of a device implementing one of the embodiments of the present invention;

FIG. 6 is an illustration of a generalized block diagram of the hardware of the present invention;

FIG. 7 is a flowchart illustrating the method of assigning a policy to a manual information input module;

FIG. 8 is an illustration of a device implementing one of the embodiments of the present invention; and FIG. 9 is a flowchart illustrating a process according to one of the embodiments.

DISCLOSURE OF INVENTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "computer readable storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processing unit(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The device can be any electronic device including computing devices, mobile communication devices, network devices, or any device that contains necessary characteristics enabling it to connect to and/or provide network connections.

A policy is a set of usage rules, a set of commands, a set of parameters, or a set of criteria that is used to precisely define how a network device operates. There are many types of policies, including but not limited to, access policies, security policies, accounting policies, services policies, routing policies, wireless channel management policies, network traffic policies, Internet Protocol (IP) packet management policies, network address translation (NAT) policies, quality of service (QoS) policies, virtual private network (VPN) policies, power mode policies etc. It would be apparent to those skilled in the art that there are many methods and techniques to define policies.

Policies are configurable by a user, manufacturer, or operator of the device, either locally or remotely. In one of the embodiments of the present invention, policies of a device can be configured through a web-interface, computer software, console port, serial port, parallel port, infra-red communications, mobile application or any user interface depending on the device being configured.

A change instruction is an instruction in the format of text or binary data. There are two kinds of change instructions. One kind of change instruction is received by the processor of the device through an accessible network, a communication port or the manual information input module, causing the processor to change one or more settings of a policy, which is corresponding to the manual information input module. Another kind of change instruction is received by the processor of the device through an accessible network, a communication port or the manual information input module, causing the processor to replace a first policy corresponding to the manual information input module with a second policy, and then the second policy becomes corresponding to the manual information input module.

In order to provide a better understanding of the present invention, various examples of each embodiment shall be provided.

FIG. 1 is an illustrative block diagram of a device 101 according to one of the embodiments. Device 101 comprises network interface 103, device interface 102, processing unit 104, computer readable storage medium 105 and manual information, input module 106. Settings for policies of the device 101 are stored in computer readable storage medium 105.

A network interface, such as network interface 103 can be an Ethernet interface, a frame relay interface, a fibre optic interface, a cable interface, a DSL interface, a token ring interface, a serial bus interface, a Universal Serial Bus (USB) interface, Firewire interface, Peripheral Component Interconnect (PCI) interface, or any other interface that is able to connect device 101 with another network device.

A network interface may be implemented by a standalone electronic component or may be integrated with other electronic components. A network interface may have no network connection or at least one network connection depending on the configuration. A network interface is only connected to one accessible network. Therefore, there may be more than one network connection being carried by one accessible network.

A device interface, such as device interface 102, can be a fibre optic interface, a cable interface, a serial bus interface, a parallel bus interface, a USB interface, Firewire interface, Thunderbolt interface, PCI interface, or any other interface that connect device 101 with another device. A user, for example, can plug in a USB 3G modem into device interface 102 for network communication. is able to connect device 101 with another device. A user, for example, can plug in a USB 3G modem into device interface 102 for network communication.

A manual information input module, such as manual information input module 106 is mounted on device 101. Manual information input module 106 is a module that obtains information from a user and allows a user to provide input information to device 101. The obtained information invokes a processor of the device, such as processing unit 104 to retrieve a policy from a computer readable storage medium of the device, such as computer readable storage medium 105.

Method:

The initial set up of the device comprises the configuration of a manual information input module of the device and assigning policy(s) to the manual information input module.

FIG. 7 is a flowchart illustrating the method of assigning a policy to a manual information input module. When a policy is assigned to the manual information input module, the policy becomes a corresponding policy to the manual information input module. In step 701, using device 101 in FIG. 1 as an example, the user initiates the assigning of a policy to the manual information input module, such as manual information input module 106. In step 702, the processor, such as processing unit 104, determines if there is any previous policy corresponding policy to the manual information input module. If there is no previous policy corresponding policy to the manual information input module, step 704 is conducted after step 702. In step 704, the policy is retrieved by the processor from a computer readable storage unit, such as computer readable storage unit 105. In step 705, the processor assigns the policy to the manual information input module, and the policy becomes the corresponding policy of the manual information input module. If there is a previous policy corresponding to the manual information input module, step 701 comprises receiving of a change instruction by the device through an accessible network, communication port, or the manual information input module. In this scenario, step 703 is conducted after step 702 in order to replace the previous policy corresponding policy to the manual information input module with a second policy. Then the second policy becomes the policy corresponding to the manual information input module. In step 703, the processor stops associating the previous corresponding policy with manual information input module in order to successfully assign a second policy to the manual information input module. In step 704, the processor retrieves the policy, which is being assigned to the manual information input module, from a computer readable storage medium, such as computer readable storage medium 105. In step 705, the processor assigns the second policy to the manual information input module, and the second policy becomes the policy corresponding to the manual information input module.

If the manual information input module comprises more than one component, policies are assigned to each of the components and the method of FIG. 7 is conducted for each of the components.

In one of the embodiments of the present invention, when the device is a network device, step 701 is conducted when the device receives a change instruction through an accessible network, a communication port, or the manual information input module. For example, the device, is connected to a computing device or a mobile communications device using an interface such as a console port, a serial port, a parallel port, an infra-red communications interface, or any other interface capable of connecting the device to a computing device or a mobile communications device. The device is then configured through a web-interface, computer software, a mobile application, or any configuration interface depending on the device being configured. In one of the embodiments, a change instruction is sent through the interface to the processor to change one or more settings of the policy corresponding to the manual information input module. The changed one or more settings of the corresponding policy settings are stored in the computer readable storage medium of the device.

In one of the embodiments of the present invention, when the device is a computing device or a mobile communications device, step 701 is conducted when the device receives a change instruction through a web interface, computer software, a mobile application, or any configuration interface depending on the device being configured. In one of the embodiments, a change instruction is sent through the interface to the processor to change one or more settings of the policy corresponding to the manual information input module. The changed one or more policy settings are stored in the computer readable storage medium of the device. In one of the embodiments of the present invention, the default policy(s) assigned to the manual information input module is set by the manufacturers of the device.

In one of the embodiments of the present invention, there is no default policy assigned to the manual information input module, and hence the manual information input module is not associated with any policy(s). The user is required to assign a policy(s) to the manual information input module as a part of the initial setup of the device, by the method described in FIG. 7.

FIG. 2 is a flowchart illustrating one of the generalized methods of the present invention according to one of the embodiments. In FIG. 2, using device 101 in FIG. 1 as an example, in step 201, information is obtained through a manual information input module, such as manual information input module 106. In step 202, the processor, such as processing unit 106, determines whether to execute or disable the policy corresponding to the manual information input module. If the processor determines to disable the corresponding policy, step 205 is conducted, and the corresponding policy is disabled. If the processor determines to execute the corresponding policy, step 203 is conducted. In step 203, the processor retrieves corresponding policy from the computer readable storage medium of the device, such as computer readable storage medium 105. In step 204, the processor executes the corresponding policy.

In one of the embodiments of the present invention, step 201 is conducted through a switch mounted on the device. The switch is comprised in the manual information input module specified in step 201. When the switch is pressed, the device obtains information through the switch. In step 202, the processor determines whether to execute or disable the policy corresponding to the switch. When the manual information input module is set to a specific position associated with the execution of the corresponding policy, for example, by pressing, setting to the 'on' position, or toggling to the '1' position, the processor determines to execute the corresponding policy in step 202 because the manual information input module is set to the specific position that is associated with the execution of the corresponding policy. If the processor determines to execute the corresponding policy, step 203 is carried out and the corresponding policy is retrieved from the computer readable storage medium in step 203. In step 204, the processor executes the corresponding policy. When the manual information input module is set to another specific position associated with the disablement of the corresponding policy, for example, by releasing, setting to the 'off' position, or toggling to the '0' position, the processor determines to disable the corresponding policy in step 202 because the manual information input module is set to the specific position associated with the disablement of the corresponding policy. If the processor determines to disable the corresponding policy, step 205 is carried out and the processor disables the corresponding policy.

In one of the embodiments of the present invention, step 201 is conducted through a single knob switch mounted on the device. The knob switch is comprised in the manual information input module specified in step 201. In this embodiment, multiple policies are assigned to available positions of the knob switch respectively. The knob switch is turned to choose from the multiple policies and it is pressed to initiate execution of a policy. The policy that is chosen is the policy corresponding to a specific position of the knob switch. The obtained information is used in step 202, to determine whether execute or disable the corresponding policy. If the knob switch is pressed when it is in the specific position, the processor initiates execution of the policy corresponding to the specific position because the knob switch is pressed and step 203 is carried out and the corresponding policy is retrieved from the computer readable storage medium. The processor executes the corresponding policy in step 204. If the knob switch is released when it is in the specific position, the processor initiates the disablement of the corresponding policy because the knob switch is released, and step 205 is conducted to disable the corresponding policy.

In one of the embodiments of the present invention, step 201 is conducted through one knob and one switch mounted on the device. The knob and switch are comprised in the manual information input module specified in step 201. In this embodiment multiple policies are assigned to available positions of the knob respectively. The knob is used to choose the policies by turning the knob to a specific position and the switch is used to initiate the execution of a policy corresponding to the specific position. When the switch is pressed, step 201 is performed. In step 202, the processor determines whether to execute or disable the corresponding policy. In one variant, when the switch is set to a specific position associated with the execution of the corresponding policy, for example, by pressing, setting to the 'on' position, or toggling to the '1' position, the processor determines to execute the corresponding policy in step 202 because the manual information input module is set to the specific position that is associated with the execution of the corresponding policy. If the processor determines to execute the corresponding policy, step 203 is conducted. In step 203, the processor retrieves the corresponding policy from the computer readable storage medium. In step 204, the processor executes the corresponding policy. In another variant, when the switch is set to another specific position associated with the disablement of the corresponding policy, for example, by releasing, setting to the 'off' position, or toggling to the '0' position, the processor determines to disable the corresponding policy in step 202 because the manual information input module is set to the specific position that is associated with the disablement of the corresponding policy. If the processor determines to disable the corresponding policy, step 205 is conducted. In step 205, the processor disables the corresponding policy.

In one of the embodiments of the present invention, the device comprises a display panel and navigation keys mounted on the device to navigate through policies displayed on the display panel. The navigation keys are comprised in the manual information input module specified in step 201. A user uses navigation keys to choose a policy and then uses the navigation keys or a switch to initiate the execution of the corresponding policy that is chosen through the navigation keys.

In one of the embodiments of the present invention, step 201 is conducted through a sound receiver, such as a microphone, mounted on the device. The sound receiver is comprised in the manual information input module specified in step 201. In this embodiment, the device comprises a voice recognition system to analyze the information received through the sound receiver. The user chooses a policy and initiates the execution of the policy by speaking into the sound receiver.

In one of the embodiments of the present invention, step 201 is conducted through a touch-screen mounted on the device. The touch-screen is comprised in the manual information input module specified in step 201. The user chooses a policy and initiates the execution of the policy by using the touch-screen.

In one of the embodiments of the present invention, the input of the user obtained in step 201 is processed in the processor, such as processing unit 104 and the processor retrieves the policy from a computer readable storage medium, such as computer readable storage medium 105, in step 203 according to the obtained information in step 201.

In one of the embodiments of the present invention, when a corresponding policy is retrieved in step 203 from the computer readable storage medium of the device, the corresponding policy retrieved in step 203 is executed in the device in step 204. Step 204 is conducted when the device's processor invokes the device's network interface to execute the corresponding policy.

Device:

A policy of a device, such as device 101 in FIG. 1, is assigned to a manual information input module, such as manual information input module 106, by connecting the device to a computing device or a mobile communications device using an interface such as a console port, a serial port, a parallel port, an infra-red communications interface, and configuring the device through a web-interface, computer software, a mobile application, or any configuration interface depending on the device being configured. When assigning of a policy is initiated through one of these medium, the processor of the device, such as processing unit 106, retrieves the policy from the computer readable storage medium of the device, such as computer readable storage medium 105. The processor assigns the policy to the manual information input module and the policy becomes the corresponding policy of the manual information input module. If the manual information input module has a corresponding policy, the corresponding policy can be replaced by a second policy by the processor of the device upon receiving an instruction to do so. Then the second policy becomes the policy corresponding to the manual information input module.

FIG. 3 is an illustration of a device implementing one of the embodiments of the present invention. Device 301 is a network device. Port 303 is an Ethernet port performing the function of a network interface, such as network interface 103 in FIG. 1. Port 304 and port 305 are USB ports performing the function of a device interface, such as device interface 102 in FIG. 1. The scope of the embodiment is not limited to Ports 303, 304 and 305 being Ethernet ports or USB ports. Ports 303, 304 and 305 are replaceable by one or more of the following interfaces: Ethernet interface, a frame relay interface, a fibre optic interface, a cable interface, a DSL interface, a token ring interface, a serial bus interface, a Universal Serial Bus (USB) interface, Firewire interface, Peripheral Component Interconnect (PCI) interface, or any other interface that is able to connect device 301 with another network device.

In one of the embodiments of the present invention, device 301 is a network device. Switch 302 is a manual information input module of device 301 which is mounted on device 301. The configuration of device 301 includes, but is not limited to, the configuration of switch 302 where the user assigns a policy to switch 302. This configuration allows the policy to become a corresponding policy of switch 302, and pressing switch 302 executes the corresponding policy. When switch 302 is pressed, device 301 obtains information, and the policy corresponding to switch 302 is retrieved from a computer readable storage medium of device 301. Pressing switch 302 initiates the execution of the corresponding policy. For example, a policy corresponding to switch 302 is a policy for enabling at least one service set identification (SSID). Device 301 works either as an IEEE 802.11 or Wi-Fi access point (AP) which provides local area network (LAN) through the SSID. The corresponding policy allows device 301 to provide IEEE 802.11 or Wi-Fi connectivity, the inclusion of the at least one SSID, the list of allowed hosts to be connected to device 301 through the at least one SSID, and the passwords associated with the at least one SSID. When switch 302 is pressed, the processor determines to execute the policy corresponding to switch 302 because switch 302 is pressed. Hence the corresponding policy is executed to allow device 301 to start providing IEEE 802.11 or Wi-Fi connectivity. On the other hand, when switch 302 is released, the processor determines to disable the policy corresponding to switch 302 because switch 302 is released. Hence device 301 stops the execution of the corresponding policy and results in no IEEE 802.11 or Wi-Fi connectivity being provided by device 301.

In one of the embodiments of the present invention, device 301 is a network device which comprises switch 302, Ethernet port 303, USB ports 304 and 305 and an embedded modem. The embedded modem which is for wireless communication is a LTE modem, a 3G modem, a Wi-Fi modem, a WiMAX modem, a Zigbee modem, a Bluetooth modem or any modem capable of communicating using wireless protocol. Switch 302 is the manual information input module of device 301. For example, the embedded modem of device 301 is a 3G modem, and an external LTE USB modem is plugged into USB port 305. When the policy corresponding to switch 302 is not being executed, only the network accessible through the embedded modem is used to send and receive data and the networks accessible through ports 303, 304, and 305 are not used to send and receive data. The policy corresponding to switch 302 allows device 302 to start using the network accessible through USB port 305. When switch 302 is pressed, the processor determines to execute the corresponding policy, because switch 302 is pressed, and device 301 then uses the networks accessible through the external LTE USB modem and the embedded 3G modem to send and receive data. When switch 302 is released, the processor determines to disable the corresponding policy, because switch 302 is released, and device 301 stops using the network accessible through USB port 305 to send and receive data.

In one of the embodiments of the present invention, device 301 is connected to a plurality of accessible networks. For example, device 301 is connected to a network accessible through an Ethernet connection at port 303, a network accessible through a USB Wi-Fi modem plugged in port 304, a network accessible through a USB LTE modem plugged in port 305 and a network accessible through an embedded 3G modem. The policy corresponding to switch 302 is to use at least two of the plurality of accessible networks. Therefore, when switch 302 is pressed, the policy corresponding to switch 302 is executed and at least two of the plurality of accessible networks are used to send and receive data. For example, when the corresponding policy is being executed, three of the plurality of accessible networks, i.e., the network accessible through an Ethernet connection at port 303, the network accessible through the USB Wi-Fi modem plugged in port 304, and the network accessible through the USB LTE modem plugged in port 305, are being used to send and receive data. When switch 302 is released, the corresponding policy stops being executed and at least one of the at least two accessible networks is not used to send and receive data, for example, device 301 stops using the network accessible through the USB LTE modem to send and receive data. The network accessible through the embedded 3G modem is not used to send or receive data when the corresponding policy is being executed and also when the corresponding policy is not being executed. Not using one of the plurality of the accessible networks in both cases, i.e. when the corresponding policy is being executed and when the corresponding policy is not being executed, could be desirable in a scenario where it is not financially feasible to use the one of the plurality of the accessible networks, or when the one of the plurality of the accessible networks is reserved for some other specific purpose. The benefits of this embodiment is to increase bandwidth available, improve redundancy, and improve reliability through all accessible networks, by using a switch, wherein at least one of these accessible networks is a wireless access network.

In one of the embodiments of the present invention, device 301 is connected to a plurality of accessible networks. For example, device 301 comprises an Ethernet connection at port 303, a USB Wi-Fi modem plugged in port 304, a USB LTE modem at port 305 and an embedded 3G modem. The policy corresponding to switch 302 is to use all accessible networks. Therefore, when the policy corresponding to switch 302 is not being executed, device 301 only uses the network accessible through the embedded 3G modem to send and receive data, and does not use the networks accessible through the Ethernet connection at port 303, the Wi-Fi module at port 304 and the LTE modem at port 305. In this embodiment, the policy corresponding to switch 302 allows device 301 to send and receive data through all of the plurality of accessible networks. Hence, when switch 302 is pressed, the processor determines to execute the policy corresponding to switch 302 because switch 302 is pressed and therefore device 301 uses all accessible networks, i.e. the network accessible through the Ethernet connection at port 303, the network accessible through the Wi-Fi modem at port 304, the network accessible through the LTE modem at port 305 and the network accessible through the embedded 3G modem, to send and receive data. When switch 302 is released, the processor determines to disable the policy corresponding to switch 302 and therefore the corresponding policy is disabled, as switch 302 is released. Device 301 stops using port 303, port 304, and port 305 to send and receive data and only uses the network accessible through the embedded 3G modem to send and receive data. The benefit of this embodiment is increase bandwidth available, improve redundancy, and improve reliability through the use of a wireless access network by using a switch.

In one of the embodiments, the data sent by the device through one or more accessible networks is data generated by the device.

In one of the embodiments, the device is a router and the data sent by the device is data received by the device.

In one variant, the corresponding policy is to bond the plurality of accessible networks that are used to send and receive data together to form one logical network connection, such as a VPN. It will be apparent to those skilled in the art how to bond more than one network connections together.

In one of the embodiments of the present invention, device 301 in FIG. 3 is a computing device which comprises switch 302, Ethernet port 303, USB ports 304 and 305 and an embedded modem. The embedded modem which is for wireless communication is a LTE modem, a 3G modem, a Wi-Fi modem, a WiMAX modem, a Zigbee modem, a Bluetooth modem or any modem capable of communicating using wireless protocol. For example, the embedded modem of device 301 is a 3G modem, and an external LTE USB modem is plugged in USB port 305. Switch 302 is the manual information input module of device 301. Switch 302 is configured to correspond to Network Address Translation (NAT) mapping settings of device 301. NAT mapping settings include NAT mapping rules for LAN clients, inbound mappings, outbound mappings, etc. The policy corresponding to switch 302 causes the inbound mapping settings to override the inbound firewall rules of device 301. Pressing switch 302 initiates the execution of the corresponding policy. When switch 302 is pressed, the processor determines to execute the policy corresponding to switch 302 because switch 302 is pressed, and the inbound mapping settings override the inbound firewall rules of device 301.

In one of the embodiments of the present invention, device 301 is a mobile communication device. Switch 302 is a manual information input module of device 301 mounted on device 301. In this embodiment, switch 302 is a button on the mobile communication device, a navigation key on a mobile communication device display, a key on a mobile phone application in a mobile communication device with touch-screen display, or any system to allow user input. For example, device 301 comprises an embedded Wi-Fi modem and an embedded 3G modem. The policy corresponding to switch 302 is to establish multiple network connections in device 301. Pressing switch 302 initiates the execution of the corresponding policy. Therefore, when switch 302 is pressed, the processor executes the policy corresponding to switch 302 and device 301 has multiple network connections via the embedded Wi-Fi modem and the embedded 3G modem.

FIG. 4 is an illustration of a device implementing one of the embodiments of the present invention. Knob 402 and switch 403 are comprised in the manual information input module which is mounted on device 401. Block 405 represents one or more device interface(s) of device 401. Block 406 represents one or more network interface(s) of device 401.

The one or more network interface(s) is an Ethernet interface, a frame relay interface, a fiber optic interface, a cable interface, a DSL interface, a token ring interface, a serial bus interface, a USB interface, Firewire interface, PCI interface, or any other interface that is able to connect device 401 with another network device.

The one or more device interface(s) is a fiber optic interface, a cable interface, a serial bus interface, a parallel bus interface, a USB interface, Firewire interface, Thunderbolt interface, PCI interface, or any other interface that is able to connect device 401 with another device.

In one of the embodiments of the present invention, device 401 is a network device. Device 401 comprises knob 402 which allows a user to choose multiple settings for a policy, and switch 403 which is pressed for initiating the execution of a policy corresponding to the position of knob 402. For example, switch 403 is configured with a policy which blocks all traffic from a specific IP address corresponding to the position of knob 402 from passing through device 401. Therefore when switch 403 is pressed, incoming and outgoing traffic to and from the specific IP address are blocked. The specific IP address is determined by the configuration of knob 402. For example, mark '1' 411 of the knob 402 corresponds to the IP address 1.2.3.4, mark '2' 412 of the knob 402 corresponds to the IP address of website www.facebook.com, and similarly mark '5' 415 of the knob 402 corresponds to website www.wikipedia.com, and so on. In this example, arrow 404 of knob 402 is pointed towards mark '5' 415 and hence, if the switch 403 is pressed when arrow 404 is pointed towards mark '5' 415, the processor executes the policy corresponding to mark '5' 415 and device 401 blocks all incoming and outgoing traffic to and from www.wikipedia.com.

In one of the embodiments of the present invention, a device is identical to device 401 with the exception that switch 403 and knob 402 is a knob switch that can be pressed and turned. In this embodiment, knob switch 402 allows the user to execute or disable one or multiple policies at the same time. Knob switch 402 is used to choose the policy and to initiate the execution of the policy. Knob switch 402 is a biased normally-open switch or a biased normally-closed switch in which initiation of the execution or disablement of the corresponding policy is triggered by pressing knob switch 402. Every time knob switch 402 is pressed, an internal spring in knob switch 402 allows knob switch 402 to bounce back to its original position. Those of ordinary skill in the art would know how a biased switch operates. When knob switch 402 is pressed while arrow 404 is pointing to a specific mark, the processor checks if the policy corresponding to the specific mark is being executed in device 401 from before or not. If the corresponding policy is not being executed from before, the processor associates the pressing of knob switch 402 with the execution of the corresponding policy. If the corresponding policy is being executed from before, the processor associates the pressing of knob switch 402 with the disablement of the corresponding policy. The policy is chosen by turning knob switch 402 to the specific mark corresponding to the policy. The chosen policy is then corresponding to the specific mark. Knob switch 402 has the characteristics of both a knob and a switch. This feature is useful because it allows multiple policies to be executed without disabling a policy previously executed. For example, in order to connect to a specific accessible network, Accessible Network One, mark '1' 411 of knob switch 402 is configured to connect to Accessible Network One. The authentication information required to connect to Accessible Network One is stored in the computer readable storage medium of the device 401. For simplicity of the description of this embodiment, connecting to Accessible Network One shall be referred to as Policy One. The user wishes to execute a second policy, Policy Two, which corresponds to mark '2' 412 of the knob. Policy Two has a configuration which connects device 401 with another accessible network, Accessible Network Two, and then bond Accessible Network One and Accessible Network Two to form one VPN connection. The user could first execute Policy One to connect to Accessible Network One and then execute Policy Two in order to connect to Accessible Network Two and then bond Accessible Network One and Accessible Network Two to form one VPN connection. A bonded VPN connection is then created between device 401 and a VPN server. This whole example can be carried out in a few simple steps using the present invention. First, in order to execute Policy One, knob 402 is turned to mark '1' 411, i.e. arrow 404 points to mark '1' 411, and knob switch 402 is pressed. The processor of device 401 then executes the corresponding policy of mark '1' 411. Second, in order to execute Policy Two, knob switch 402 is turned to mark '2' 412, i.e. arrow 404 points to mark '2' 412, and knob switch 402 is pressed. The processor of device 401 then executes the corresponding policy of mark '2' 412. Any one of the corresponding policies can be disabled by turning knob switch 402 and pointing arrow 404 to their corresponding mark and pressing knob switch 402 again. Pressing knob switch 402, when arrow 404 is pointing to mark which has a corresponding policy that is being executed from before, allows the processor of device 401 to disable the corresponding policy.

In one of the embodiments of the present invention, device 401 is a network device which comprises a manual information input module consisting of only knob 402. Each mark 411, 412, 413, 414, 415, 416, 417, 418, and 419 in knob 402 has their corresponding policies. The settings of the policy are defined by the user, manufacturer or network administrator of device 401. This embodiment provides the user a choice to choose among multiple policies, and each of the multiple policies is previously configured with fixed settings. Knob 402 is turned towards the mark corresponding to the policy the user chooses, i.e. arrow 404 points to the mark corresponding to the policy the user chooses, and this initiates the execution of the corresponding policy chosen by the user.

FIG. 5 is an illustration of a device implementing one of the embodiments of the present invention. Block 502 represents one or more device interface(s) of device 500. Block 503 represents one or more network interface(s) of device 500.

The one or more network interface(s) can be an Ethernet interface, a frame relay interface, a fiber optic interface, a cable interface, a DSL interface, a token ring interface, a serial bus interface, USB interface, Firewire interface, PCI interface, or any other interface that is able to connect device 500 with another network device.

The one or more device interface(s) can be a fiber optic interface, a cable interface, a serial bus interface, a parallel bus interface, a USB interface, Firewire interface, Thunderbolt interface, PCI interface, or any other interface that is able to connect device 500 with another device.

Device 500 is a network device which comprises a display, such as display module 501 and navigation keys, such as navigation keys 511, 512, 513, 514, and 515 which makes the network device capable of providing viewing and executing and disabling of multiple policies with multiple settings. The navigation keys are comprised in the manual information input module of device 500 and are mounted on device 500. A display can be a LCD, OLED, LED, PDP, etc. The navigation keys which allow a user to navigate messages appearing in display module 501 comprises 'up', 'down', 'left', 'right', and 'enter' keys. For example, in FIG. 5, device 500 comprises display module 501 with a menu displaying policies and their settings. The policies are listed in Policies menu 521 and their settings are displayed in Settings menu 522. Display module 501 contains an indication mechanism to indicate which menu item the user is currently on. The indication mechanism can be highlighting the menu item, producing a sound, etc. It would be apparent to those of ordinary skill in the art that there exists many ways to provide such indication. FIG. 5 illustrates an implementation of this embodiment. The indication mechanism shown in FIG. 5 is highlighting of the selected menu item. 'Policy 1' 531 corresponds to the use of dynamic DNS, 'Policy 2' 532 corresponds to a QoS policy, 'Policy 3' 533 corresponds to a fail over policy, 'Policy 4' 534 corresponds to a wireless radio policy, 'Policy 5' 535 corresponds to a client isolation policy, and 'Policy 6' 536 corresponds to a multicast enhancement policy. When a certain policy, in this example, 'Policy 1' 531, is highlighted, right key 512 is used to display settings for the certain policy. Down key 513 and up key 511 are used to navigate through the settings and to highlight the preferred parameter. Enter key 515 is used to choose the highlighted parameter for the certain policy and to initiate the execution of the certain policy with chosen parameter. Left key 514 is used to return to policies menu 521. In this example, 'Policy 1' 531 specifies the use of dynamic DNS. The settings include a list of DNS service providers to be used for the WAN. The service provider is chosen by using up key and down key 511 and 513 respectively and is highlighted on the screen. Pressing enter key 515 initiates the execution of 'Policy 1' with the chosen parameter.

FIG. 6 is an illustration of a generalized block diagram of one of the implementations of the present invention.

In one of the embodiments of the present invention, a device, such as device 601 comprises an manual information input module, such as manual information input module 602 which is mounted on device 601, a processor, such as processing unit 604, a network interface, such as network interface 603, an computer readable storage medium internal storage, such as computer readable storage medium 606 and a display, such as display module 605.

Device 601 is a network device. Manual information input module 602 is used to obtain input information from the user. Processing unit 604 processes the input information of the user and monitors the execution of policies in network interface 603, and operations carried out by computer readable storage medium 606 and display module 605. Network interface 603 is used by processing unit 604 to connect to another network device. Display module 605 displays policies with settings and/or provides indications regarding the execution of policies in device 601. Computer readable storage medium 606 stores instructions for processing unit 604, policies, settings of policies and configurations that are unrelated to policy settings such as static IP address, MAC address, etc.

In one of the embodiments, a device is identical to device 601 with the exception that display module 605 is omitted.

A display module, such as display module 605, comprises one or more of the following indicators to indicate the actions of the user carried out through the manual information input module: LED lights, speaker, digital display panel, etc.

A network interface, such as network interface 603, at a device, such as device 601, may be an Ethernet interface, a frame relay interface, a fiber optic interface, a cable interface, a DSL interface, a token ring interface, a serial bus interface, an USB interface, Firewire interface, PCI interface, or any other interface that is able to connect device 601 with another network device. A network interface may be implemented by a standalone electronic component or may be integrated with other electronic components. A network interface may have no network connection or at least one network connection depending on the configuration. A network interface is only connected to one accessible network. Therefore, there may be more than one network connection being carried by one accessible network.

In one of the embodiments of the present invention, manual information input module 602 comprises one switch, mounted on device 601, that is used to initiate the execution or disablement of a policy of device 601 corresponding to the switch.

In one of the embodiments of the present invention, manual information input module 602 comprises one knob switch, mounted on device 601, that is used to choose among multiple policies and initiate the execution or disablement of the policy corresponding to a specific position of the knob switch.

In one of the embodiments of the present invention, manual information input module 602 comprises one knob, mounted on device 601, that is used to choose among multiple policies and one switch that is used to initiate the execution or disablement of the policy corresponding to a specific position of the knob.

In one of the embodiments of the present invention, manual information input module 602 comprises plurality of switches, mounted on device 601, that is used to initiate the execution or disablement of policy(s) of device 601.

In one of the embodiments of the present invention, manual information input module 602 comprises plurality of knobs, mounted on device 601, that is used to choose among multiple policies and to initiate the execution of the policies chosen among the multiple policies.

In one of the embodiments of the present invention, manual information input module 602 comprises one touch-screen, mounted on device 601, that is used to choose among multiple policies and initiate the execution of the policy(s) corresponding to the manual information input module chosen among the multiple policies.

In one of the embodiments of the present invention, manual information input module 602 comprises a sound receiver, such as a microphone mounted on device 601, that allows the user to choose and initiate execution of multiple policies by speech. The input is processed by a processor, such as processing unit 604 which comprises a voice-recognition system to analyze the information received through the sound receiver.

In one of the embodiments of the present invention, display module 605 comprises LED lights to indicate the execution of policies in device 601.

In one of the embodiments of the present invention, display module 605 comprises a graphical user interface on a display panel which displays the list of policies and allows the user to navigate through the items displayed.

In one of the embodiments of the present invention, display module 605 comprises a graphical user interface on a touch-screen which displays the list of policies and allows the user to navigate through the items displayed.

In one of the embodiments of the present invention, display module 605 comprises a speaker which is used to indicate information about device 601 and its policies to the user by audio output.

In one of the embodiments of the present invention, manual information input module 602 communicates with processing unit 604 and the policy(s) are executed in network interface 603 through processing unit 604.

In one of the embodiments of the present invention, manual information input module 602 communicates with network interface 603 through processing unit 604 and corresponding policies are retrieved by processing unit 604 from computer readable storage medium 606 and are executed in network interface 603.

In one of the embodiments of the present invention, manual information input module 602 communicates with display module 605 through processing unit 604.

In one of the embodiments of the present invention, device 601 comprises a voice recognition system which allows the user to control the policies of device 601 by speech. Manual information input module comprises a sound receiver in order to allow user to input information and initiate the execution of policy(s) by speech.

FIG. 8 is an illustration of a device implementing one of the embodiments of the present invention. Device 800 is a power over Ethernet (PoE) capable network device, such that device 800 is capable of supplying power over an Ethernet connection, and/or capable of receiving power over an Ethernet connection. Therefore, device 800 may act as a power sourcing equipment (PSE), powered device (PD), or both. A PSE supplies power through an Ethernet link to powered device(s) (PD). For example, a PSE can be a PoE capable network switch, an intermediary device between a non-PoE network switch and a PoE device, or any network device that is capable of supplying power over an Ethernet link to another device. A powered device (PD) is a device that is powered by a PSE through an Ethernet link.

According to IEEE 802.3af standard and IEEE 802.3at standard, maximum power supplied by a PSE is 15.4 watt and 34.2 watt respectively, and maximum power available at a PD is 12.95 watt and 25.5 watt respectively. The present invention relates to a PoE device, such as device 800 that comprises one or more power-receiving circuit sections and one or more power-supply circuit sections. The power-supply circuit section(s) is capable of delivering higher power than maximum power delivered in the 802.3af standard or 802.3at standard. The power-receiving circuit section(s) is capable of receiving higher power than that delivered in the 802.3af standard or 802.3at standard.

A manual information input module is mounted on device 800. The manual information input module comprises switch 801, Ethernet interfaces 802 and 803, high-power (HP) switch 804, standard-power (SP) switch 805, PSE switch 806, PSE-PD switch 807, and PD switch 808. Ethernet links can be established using Ethernet interfaces 802 and 803. As discussed above, device 800 is capable of supplying higher power than the standard. When device 800 acts as a PSE, and is supplying power to a PD that is capable of receiving high power, and operates at high power, device 800 is in a high-power PSE mode, and device 800 supplies higher power to the PD connected to it through Ethernet interfaces 802 and/or 803. Alternatively, when device 800 is supplying power to a PD that is not capable of receiving high power, and operates at standard power, device 800 is in a standard-power PSE mode, and device 800 supplies standard power to any PDs connected to it through Ethernet interfaces 802 and/or 803. When device 800 acts as a PD, and is receiving power from a power supply or a PSE that is capable of supplying high power, device 800 is in a high-power PD mode, and draws high power from the PSE. Alternatively, when device 800 is receiving power from a power supply or a PSE that is not capable of supplying high power, device 800 is in a standard-power PD mode, and draws standard power from the PSE. When device 800 acts as a PSE-PD, device 800 receives power form a PSE, and is also supplying power to a PD. If the PSE is capable of supplying high power, device 800 operates at high power, and thus is able to supply high power to the PD. If the PD is not capable of operating at high power, device 800 supplies standard power to the PD. However, if the PSE is not capable of supplying high power, device 800 operates at standard power and is not capable of supplying high power to the PD even if the PD is capable of receiving high power.

A user can manage power modes of device 800 using HP switch 804 and SP switch 805, PSE switch 806, PSE-PD switch 807, and PD switch 808. When a user wants to switch to SP mode, the user can press SP switch 805 is pressed. When the user wants to switch to HP mode, the user can press HP switch 804. The user can also manage whether device acts as a PSE, PD or both PSE and PD (PSE-PD) by using PSE switch 806, PD switch 808, and PSE-PD switch 807, respectively. In one variant, in order to confirm the power mode, the user presses one of HP switch 804 or SP switch 805, and also presses one of PSE switch 806, PD switch 808, and PSE-PD switch 807. The user then has to press switch 801 to confirm the power mode.

For example, a PD capable of operating at high power connects to device 800 via Ethernet interface 802. Device 800 is being powered from a mains electricity. The user then presses HP switch 804 and PSE switch 806, such that device 800 is in HP PSE mode. In another example, a PSE capable of supplying high power connects to device 800 via Ethernet interface 803. Device 800 does not have any PDs connected to it. The user then presses HP switch 804 and PD switch 808, such that device 800 is in HP PD mode. In another example, a PD capable of operating at high power connects to device 800 via Ethernet interface 802 and a PSE capable of supplying high power connects to device 800 via Ethernet interface 803. The user then presses HP switch 804, and PSE-PD switch 807, such that device 800 is in HP PSE-PD mode.

Device 800 may comprise internal switches that can support more than 25.5 watt passing through itself, and can be controlled by a processing circuit. The switches are closed or opened based on positions of HP switch 804, SP switch 805, PSE switch 806, PSE-PD switch 807, and PD switch 808. The internal switches can be selected from a group consisting of a field-effect transistors (FET), bipolar transistors, bipolar junction transistor (BJT) insulated-gate bipolar transistor (IGBT), metal-oxide-semiconductor FET (MOSFET), metal semiconductor FET (MESFET), junction FET (JFET), carbon nanotube FET (CNTFET), high-electron-mobility transistor (HEMT), heterostructure insulated gate FET (HIGFET), modulation-doped FET (MODFET), nanoparticle organic memory FET (NOMFET), organic FET (OFET), vertical-slit FET (VeSFET), and tunnel FET (TFET).

There are various benefits for the user being able to manage power modes of device 800. Ideally, a PD should not draw more power than it can handle, or should not draw more power than the power it operates at, even if device 800 supplies high power. However, supplying power more than a PD can handle may be a safety hazard, since if the PD has a defect, damage may be caused due to drawing high power. Furthermore, when devices are connected through an Ethernet, they may not always require PoE, or it may be preferred to only establish a data connection through the Ethernet link, rather than a power connection and a data connection. In these cases, the user reset the power mode. For example, if device 800 is currently at HP PSE mode or HP PSE-PD mode, the user can press PSE switch 806 and then press switch 801 for resetting the power mode, such that device 800 no longer supplies power to any devices connected through Ethernet interfaces 802 or 803. Similarly, if device 800 is currently at HP PD mode or HP PSE-PD mode, the user can press PD switch 808 and then press switch 801 for resetting the power mode, such that device 800 no longer receives power from any devices connected through Ethernet interfaces 802 or 803. Similarly, if device 800 is currently at HP PSE-PD mode, the user can press PSE-PD switch 807 and then press switch 801 for resetting the power mode, such that device 800 no longer receives power from or supplies power to any devices connected through Ethernet interfaces 802 or 803.

According to one of the embodiments, the power mode of device 800 is indicated by LED lights mounted on switches HP switch 804, SP switch 805, PSE switch 806, PSE-PD switch 807, and PD switch 808. For example, if device 800 is in SP PSE mode, an LED on SP switch 805 and another LED on PSE switch 806 is lit. If device 800 is in HP PD mode, an LED on HP switch 804 and another LED on PD switch 808 is lit. Therefore the current power mode of device 800 is easily determined by the user.

According to one of the embodiments, manual information input module of device 800 further comprises a knob, and/or a display module and navigation keys such as knob 402, display module 501, and navigation keys 511-515 respectively, as illustrated in FIG. 4 and FIG. 5. The user may define policies relating to power modes of device 800, and may manage the policies using the knob, display module and navigation keys. For example, a policy is defined such that at a specific time in the day, power mode of device 800 should be set to HP PSE mode. The policy can be assigned to one of the marks in the knob, or may be listed in a policies menu in the display module. The user can execute the policy according to the methods described in FIG. 4 and FIG. 5.

FIG. 9 is a flowchart illustrating a process according to one of the embodiments of the present invention. FIG. 9 is viewed in conjunction with FIG. 8 for better understanding of the embodiments. In step 901, processing unit of device 800 obtains information through a manual information input module. When a user manages the device using the manual information input module, information is entered and thus obtained by the processing unit in step 901. In step 902, the processing unit determines the current power mode of device 800. In step 903, processing unit determines whether to apply or reset the power mode based on the current power mode and the information obtained. For example, the current power mode is HP PSE mode, and the information obtained in step 901 indicates that the user pressed HP switch 804 and PSE switch 806, and confirmed input by pressing switch 801, and thus an input power mode is also HP PSE mode. When the current power mode and the input power mode is the same, it is determined that the power mode should be reset in step 904. In another example, the current power mode is HP PSE and the input power mode is SP PSE mode, i.e. the user pressed SP switch 805 and PSE switch 806, and confirmed input by pressing switch 801. In this case the current power mode and the input power mode is not the same, and hence the input power mode should be applied. In one variant, the user only needs to press SP switch 805 in order to change the power mode to SP PSE mode, since device 800 continues acting as a PSE, and the only change is in the power level. In step 905, internal switches are opened or closed in order to change the power mode, and power is supplied or received according to the power mode in step 906. For example, if the power mode changes from HP PSE mode to SP PSE mode, an internal switch that provides a current path with higher current carrying capacity is opened, and thus a current path with lower current carrying capacity is used for supplying standard power in SP PSE mode.

The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A method for supplying and receiving power over Ethernet at a device and managing the device through a manual information input module, the method comprising:
   (a) obtaining power mode information through the manual information input module by a user; wherein the manual information input module is mounted on the device; wherein the manual information input module comprises a high power (HP) switch, a standard power (SP) switch, a power sourcing equipment (PSE) switch, a powered device (PD) switch, a PSE-PD switch, a first switch, a knob, a display module, and navigation keys;
   (b) determining a current power mode of the device;
   (c) determining whether to apply an input power mode or reset the current power mode; wherein the input power mode is determined based on the information obtained in step (a), or is determined based on policies, wherein the policies are defined by a user using the manual information input module; wherein each policy is assigned to a mark in the knob, or listed in a policies menu in the display module;
   (d) stop receiving power or stop supplying power through any Ethernet interfaces if determined to reset the current power mode; wherein it is determined to reset the current power mode when the current power mode and the input power mode are the same;
   (e) opening or closing internal switches if determined to apply the input power mode when the current power mode and the input power mode are not the same; and (f) supplying or receiving power over Ethernet according to the input power mode;
wherein the device is a power over Ethernet (PoE) device configured to transmit and receive power over Ethernet at the same time.

2. The method of claim 1, wherein the device is configured to supply power and receive power higher than a first power limit, wherein the first power limit is set according to one of, IEEE802.3at standard or IEEE802.3af standard.

3. The method of claim 1, wherein the policy is based on time and the input power mode is a first input power mode in a first predefined time period.

4. The method of claim 1, wherein the manual information input module is further used for executing at least one other policy selected from a group consisting of: access policies, security policies, accounting policies, services policies, routing policies, wireless channel management policies, network traffic policies, Internet Protocol (IP) packet management policies, network address translation (NAT) policies, quality of service (QoS) policies, virtual private network (VPN) policies, and power mode policies.

5. The method of claim 1, wherein when the HP switch and PSE switch is pressed, the input power mode is HP PSE mode; wherein when SP switch and PSE switch is pressed, input power mode is SP PSE mode; wherein when the HP switch and PD switch is pressed, input power mode is HP PD mode; wherein when SP switch and PD switch is pressed, input power mode is SP PD mode; wherein when the HP switch and PSE-PD switch is pressed, input power mode is HP PSE-PD mode; and wherein when SP switch and PSE-PD switch is pressed, the input power mode is SP PSE-PD mode.

6. The method of claim 5, wherein the input power mode is confirmed after the first switch is pressed.

7. The method of claim 1, wherein the internal switches are selected from a group consisting of a field-effect transistor (FET), a bipolar transistor, an insulated-gate bipolar transistor (IGBT), a metaloxide-semiconductor FET (MOSFET), a metal-semiconductor FET (MESFET), a junction FET (JFET) and a relay.

8. The method of claim 1, wherein the device comprises at least a first Ethernet interface used for receiving power over Ethernet, and at least a second Ethernet interface used for supplying power over Ethernet.

9. The method of claim 1, wherein the current power mode is indicated to a user by light emitting diode (LED) lights mounted on the manual information input module.

10. A device for supplying and receiving power over Ethernet comprising:
at least one manual information input module;
at least one network interface;
at least one processing unit;
at least one non-transitory computer readable storage medium storing program instructions executable by the at least one processing units for:
(a) obtaining power mode information through the manual information input module by a user; wherein the manual information input module is mounted on the device; wherein the manual information input module comprises a high power (HP) switch, a standard power (SP) switch, a power sourcing equipment (PSE) switch, a powered device (PD) switch, a PSE-PD switch, a first switch, a knob, a display module, and navigation keys;
(b) determining a current power mode of the device;
(c) determining whether to apply an input power mode or reset the current power mode; wherein the input power mode is determined based on the information obtained in step (a), or is determined based on policies, wherein the policies are defined by a user using the manual information input module; wherein each policy is assigned to a mark in the knob, or listed in a policies menu in the display module;
(d) stop receiving power or stop supplying power through any Ethernet interfaces if determined to reset the current power mode; wherein it is determined to reset the current power mode when the current power mode and the input power mode is the same;
(e) opening or closing internal switches if determined to apply the input power mode when the current power mode and the input power mode are not the same; and
(f) supplying or receiving power over Ethernet according to the input power mode; wherein the device is a power over Ethernet (PoE) device capable of transmitting and receiving power over Ethernet at the same time.

11. The device of claim 10, wherein the device is configured to supply power and receive power higher than a first power limit, wherein the first power limit is set according to one of, IEEE802.3at standard or IEEE802.3af standard.

12. The device of claim 10, wherein the policy is based on time and the input power mode is a first input power mode in a first predefined time period.

13. The device of claim 10, wherein the manual information input module is further used for executing at least one other policy selected from a group entailing of: access policies, security policies, accounting policies, services policies, routing policies, wireless channel management policies, network traffic policies, Internet Protocol (IP) packet management policies, network address translation (NAT) policies, quality of service (QoS) policies, virtual private network (VPN) policies, and power mode policies.

14. The device of claim 10, wherein when the HP switch and PSE switch is pressed, input power mode is HP PSE mode; wherein when SP switch and PSE switch is pressed, input power mode is SP PSE mode; wherein when the HP switch and PD switch is pressed, input power mode is HP PD mode; wherein when SP switch and PD switch is pressed, input power mode is SP PD mode; wherein when the HP switch and PSE-PD switch is pressed, input power mode is HP PSE-PD mode; and wherein when SP switch and PSE-PD switch is pressed, input power mode is SP PSE-PD mode.

15. The device of claim 14, wherein the input power mode is confirmed after the first switch is pressed.

16. The device of claim 10, wherein the internal switches are selected from a group consisting of a field-effect transistor (FET), a bipolar transistor, an insulated-gate bipolar transistor (IGBT), a metaloxide-semiconductor FET (MOSFET), a metal-semiconductor FET (MESFET), a junction FET (JFET) and a relay.

17. The device of claim 10, wherein the device comprises at least a first Ethernet interface used for receiving power over Ethernet, and at least a second Ethernet interface used for supplying power over Ethernet.

18. The device of claim 10, wherein the current power mode is indicated to a user by light emitting diode (LED) lights mounted on the manual information input module.

* * * * *